(12) United States Patent
Woopen et al.

(10) Patent No.: US 11,034,238 B2
(45) Date of Patent: Jun. 15, 2021

(54) METHOD FOR DETERMINING A CONTACT FORCE ON A UTILITY VEHICLE

(71) Applicant: DEERE & COMPANY, Moline, IL (US)

(72) Inventors: Thomas Woopen, Windeck (DE); Norbert Fritz, Ilvesheim (DE); Rainer Gugel, Plankstadt (DE)

(73) Assignee: DEERE & COMPANY, Moline, IL (US)

(*) Notice: Subject to any disclaimer, the term of this patent is extended or adjusted under 35 U.S.C. 154(b) by 208 days.

(21) Appl. No.: 15/964,120

(22) Filed: Apr. 27, 2018

(65) Prior Publication Data

US 2018/0312063 A1    Nov. 1, 2018

(30) Foreign Application Priority Data

Apr. 28, 2017  (DE) .......................... 102017207248.2

(51) Int. Cl.
| | |
|---|---|
| *B60T 8/1769* | (2006.01) |
| *B60T 8/171* | (2006.01) |
| *B60K 23/08* | (2006.01) |
| *G07C 5/08* | (2006.01) |
| *B60T 8/172* | (2006.01) |

(Continued)

(52) U.S. Cl.
CPC ........ *B60K 23/0808* (2013.01); *B60G 17/018* (2013.01); *B60T 8/171* (2013.01); *B60T 8/172* (2013.01); *B60T 8/1769* (2013.01); *G07C 5/0841* (2013.01); *B60G 1/00* (2013.01); *B60G 2300/08* (2013.01); *B60G 2400/60* (2013.01); *B60G 2800/21* (2013.01); *B60G 2800/70* (2013.01); *B60K 2023/0858* (2013.01);
(Continued)

(58) Field of Classification Search
None
See application file for complete search history.

(56) References Cited

U.S. PATENT DOCUMENTS

| | | | | |
|---|---|---|---|---|
| 5,411,322 A | * | 5/1995 | Breen | B60T 8/1708 |
| | | | | 303/7 |
| 9,387,859 B2 | * | 7/2016 | Kato | B60L 3/102 |

(Continued)

FOREIGN PATENT DOCUMENTS

| | | |
|---|---|---|
| DE | 10307510 A1 | 9/2004 |
| DE | 102007062203 A1 | 6/2009 |

(Continued)

OTHER PUBLICATIONS

Ray, Laura R., Nonlinear Tire Force Estimation and Road Friction Identification: Simulation and Experiments, Automatica, vol. 33, No. 10, pp. 1819-1833, 1997 (Year: 1997).*

(Continued)

*Primary Examiner* — Christian Chace
*Assistant Examiner* — Amelia Vorce (57) ABSTRACT

A method for determining a contact force on a utility vehicle includes providing the utility vehicle with a first wheel axle and a second wheel axle, determining a drive slip of the second wheel axle, and a road surface-specific determination data set associated with a traction coefficient in dependence on the drive slip, and determining the contact force on the second wheel axle based on the drive slip of the second wheel axle and the road surface-specific determination data set.

15 Claims, 4 Drawing Sheets

(51) Int. Cl.
 *B60G 17/018* (2006.01)
 *B60T 8/17* (2006.01)
 *B60G 1/00* (2006.01)

(52) U.S. Cl.
 CPC ....... *B60T 2210/12* (2013.01); *B60T 2240/06* (2013.01); *B60Y 2200/221* (2013.01)

(56) References Cited

U.S. PATENT DOCUMENTS

| | | | |
|---|---|---|---|
| 10,300,918 B2 * | 5/2019 | Grutter | B60W 30/18172 |
| 2003/0154012 A1 | 8/2003 | Anwar | |
| 2011/0118935 A1 * | 5/2011 | Shiozawa | B60W 40/068 701/33.4 |
| 2013/0173127 A1 * | 7/2013 | Nakatsu | B60L 3/102 701/70 |
| 2015/0251658 A1 * | 9/2015 | Kato | B60T 8/172 701/22 |
| 2016/0082973 A1 | 3/2016 | Richards et al. | |
| 2017/0057361 A1 * | 3/2017 | Cho | B60W 20/00 |

FOREIGN PATENT DOCUMENTS

| | | |
|---|---|---|
| DE | 102011003490 A1 | 8/2012 |
| DE | 10 2015 212 897 A1 | 1/2017 |
| DE | 102015212351 A1 | 1/2017 |
| DE | 102015115852 A1 | 3/2017 |
| GB | 2499252 A | 8/2013 |

OTHER PUBLICATIONS

Nam, Kanghyum et al., Wheel Slip Control for Improving Traction-Ability and Energy Efficiency of a Person Electric Vehicle, Energies 2015, 8, 6820-6840, May 20, 2015 (Year: 2015).*
Frayne's Exeter Toyota, Video Active And Dynamic Torque Control AWD, retrieved from: https://www.youtube.com/watch?v=Elur9dgWsVM on Feb. 2, 2020, Published Nov. 27, 2015 (Year: 2015).*
German Search Report issued in counterpart application No. 102017207248.2 dated Dec. 19, 2017. (12 pages).
European Search Report issued in counterpart application No. 18168916.7 dated Feb. 20, 2019. (14 pages).
European Search Report issued in counterpart application No. 18168916.7 dated Sep. 26, 2018. (14 pages).

* cited by examiner

METHOD FOR DETERMINING A CONTACT FORCE ON A UTILITY VEHICLE

RELATED APPLICATIONS

This application claims priority to German Patent Application Ser. No. 102017207248.2, filed Apr. 28, 2017, the disclosure of which is hereby expressly incorporated by reference in its entirety.

FIELD OF THE DISCLOSURE

The present disclosure relates to a utility vehicle, and in particular, to a method for determining a contact force on a utility vehicle.

BACKGROUND

The use of force sensors on drive axles for determining the contact forces on wheels or wheel axles is known. In the case of a hydraulically suspended wheel axle, a contact force on the wheel axle can be determined via the pressure in the hydraulic cylinders of the suspension. This kind of determination of contact forces is not possible with other wheel axles.

Therefore, a need exists in order to determine contact forces on a wheel axle in a simple way.

SUMMARY

In one embodiment of this disclosure, a utility vehicle has at least one first wheel axle and one additional wheel axle, where a contact force is determined on the additional wheel axle. Here the contact force is determined dependent on at least the following characteristics:
- a drive slip associated with the additional wheel axle or determined at the wheel axle, and
- a road surface-specific determination data set (for example, a characteristic curve that represents a specific road surface), which reflects a drive slip in dependent on a traction coefficient.

The road surface-specific determination data set takes into account that, depending on the specific road surface (for example, asphalt, loamy sand, mud), thus the quality of the road surface for the utility vehicle, there is a specific relationship between a traction coefficient and a drive slip.

In addition, it is assumed that a drive slip on the additional wheel axle (for example, for each wheel of the wheel axle) and a drive force on the wheel axle (for example, for each wheel of the wheel axle) can easily be determined without additional technical cost. In particular, the physical parameters are routinely determined anyway for the control of other functions on the utility vehicle and can, for example, be queried on an electronic vehicle bus (for example, CAN).

Thus, the drive slip on a wheel of the additional wheel axle can be calculated in particular by utilizing various physical parameters of the utility vehicle, which are available as data on the utility vehicle. The physical parameters are, for example, the driving speed of the utility vehicle (determined, for example, by GPS, radar), a steering system, known primary geometries of the utility vehicle, wheel rpms, and the rolling radius of the tires. The drive slip can be determined for each wheel of the additional wheel axle by taking into account any or all of the parameters. More precisely, the drive slip on the relevant wheel results from the (considerable) difference between the circumferential speed of the wheel and the speed of travel of the utility vehicle with respect to the ground, normalized to the circumferential speed of the wheel. The speed of travel of the utility vehicle with respect to the ground can be derived here from the determined driving speed of the utility vehicle, whereas the rolling radius of the tire enters into the circumferential speed of the wheel in addition to the relevant wheel rpm.

If the determined drive slip then is related to the road surface-specific determination data set, a corresponding value of a traction coefficient can be determined.

The drive force of the additional wheel axle or an individual wheel of the wheel axle is advantageously technically easily derivable in that the already determined drive force on the first axle or on a plurality of wheel axles other than the additional wheel axle is subtracted from the known total drive force that is transferred by the drive train of the utility vehicle.

According to the general physical formula $$\kappa = F\_drv / F\_con,$$

the contact force F_con on the additional wheel axle can then be determined, where –κ is the traction coefficient, –F_drv is the drive force in the direction of travel (for example, of an individual wheel or on the wheel axle), and –F_con is the contact force in the direction of a vertical axis of the utility vehicle (for example, of an individual wheel or on the wheel axle).

With the described procedure, contact forces can be measured at any wheel axle on the utility vehicle without additional components (for example, sensors) or technical installation cost. Correspondingly, the total load of the utility vehicle, i.e., the sum of all contact forces, can be technically easily estimated. Since the contact force is determined dependent on the physical parameters drive slip and traction coefficient, the determination can take place under various driving conditions. In addition, a cross comparison of the contact force determined under different driving conditions can contribute to improving the accuracy of the actual contact force.

In particular, the described determination of the contact force can also be used on unsuspended wheel axles, which are connected directly, without a suspension, to a bearing structure of the utility vehicle. For example, this is the case with the rear axle of a utility vehicle, in particular a tractor or other agricultural vehicle, while the front axle is suspended, so that its contact force (i.e., the proportion of the vehicle weight that bears on the axle) can be determined via the pressure in the hydraulic cylinders of the suspension.

In one embodiment, the utility vehicle is a tractor, the first wheel axle of which is a front axle and the additional wheel axle of which is a rear axle. In particular, the utility vehicle has all-wheel drive.

The road surface-specific determination data set for determining a traction coefficient on the additional wheel axle is made available by it being derived from a road surface-specific base data set, which is associated with the first wheel axle of the utility vehicle. The base data set reflects a specific road surface of the utility vehicle (for example, asphalt, loamy sand, mud). The reflecting takes place, for example, in the form of a characteristic curve, which represents a traction coefficient dependent on a drive slip.

Depending on physical boundary conditions, the derivation of the road surface-specific determination data set from the base data set means that the former is either identical to the base data set or differs from the base data set.

For example, the derivation of the determination data set from the base data set takes place dependent on at least one of the following parameters:
- a vehicle speed of the utility vehicle,
- a steering status of the utility vehicle,
- a driving track of the first wheel axle,
- a driving track of the additional wheel axle,
- a rolling radius of at least one wheel of the first wheel axle, and
- a rolling radius of at least one wheel of the additional wheel axle.

The current values of the parameters are available without additional technical cost, since in many cases they are standardly determined for other control purposes on the utility vehicle and can be queried on an electronic bus (for example, CAN) of the utility vehicle.

The determination data set is derived according to the criteria to be described.

In a first group of cases, it is assumed that at the additional wheel axle there is a specific road surface or a road surface property that is comparable to the specific road surface at the first wheel axle. In such cases the base data set can be used identically to the determination data set. This is possible, for example, when driving over a hard surface (for example, asphalt, hard loamy ground) or also in the case of curved paths, when the additional rear axle (for example, rear axle) does not follow the now compacted driving track of the first wheel axle (for example, front axle).

In another group of cases, it is assumed that the road surface property at the first wheel axle is different from the road surface property at the additional wheel axle. In such cases, the determination data set is derived from the base data set with a correction factor. For example, the additional wheel axle (for example, rear axle) follows the driving track of the first wheel axle (for example, front axle) exactly, so that on soft arable soil, an already compacted and thus higher-traction road surface is present for the additional wheel axle. In such a case, the road surface-specific determination data set is provided by correcting the road surface-specific base data set in the direction of a more compact road surface.

In a further embodiment, a road surface-specific base data set (for example, a characteristic curve) is determined by providing a plurality of different road surface-specific data sets (for example, a characteristic curve field with different characteristic curves), each of which reflects a traction coefficient dependent on a drive slip. In addition, on the first wheel axle (for example, for the entire wheel axle, for one wheel, or for each of the two wheels) a value of the traction coefficient and a value of the drive slip are determined (the traction coefficient being determined by means of a drive force and a contact force on the first wheel axle). From these values the applicable base data set can be determined from the available different road surface-specific data sets.

In this case there is the possibility of using the determined contact force to control a braking device of the utility vehicle, in particular on its first wheel axle, or to control an all-wheel clutch of the utility vehicle. The braking device or the all-wheel clutch are thus controlled in dependence on the determined contact force.

In an alternative embodiment, the control of a braking device or all-wheel clutch is carried out dependent on the determined contact force and without dependence on a combination with one or more of the aforementioned features. In other words, in this case a determined contact force is used as the starting parameter for the control without regard to how the contact force was determined on a wheel axle. For example, an appropriate sensor system on the utility vehicle can be used to determine the contact force. For example, the determined contact force can be used as the input parameter for an ABS (antilocking system) control, which controls a braking device dependent on the determined contact force.

In another embodiment, the all-wheel clutch transferring a torque from one wheel axle to another wheel axle can be controlled so that the transferred transfer torque is at most a defined maximum torque, where the maximum torque is determined dependent on a maximum braking torque. In this way the maximum transfer torque can be dimensioned so that in a braking operation on a wheel axle, its wheels do not become completely locked; thus a maximum braking is achieved on the wheel axle. This is based on the assumption that in the case of a utility vehicle, in particular a tractor, the all-wheel clutch becomes activated in a braking operation. In this case the all-wheel drive is completely engaged via an all-wheel clutch. Because of the activation of the all-wheel drive, the braking force of the rear wheel brakes can also act on the front wheels via the drive train of the utility vehicle. This leads to enhanced braking of the front wheels. Here any locking of the front wheels can be avoided in that the maximum braking torque and maximum transfer torque are defined. Through a control of the torque of the all-wheel clutch, it will be set so that its torque capacity does not exceed the maximum transfer torque. Through this, the front axle of the utility vehicle, which is the axle that is mainly involved in the braking operation, is operated in its optimum traction range. Consequently, any locking of the front axle at the expense of the rear axle, which is not highly loaded, can be avoided.

With appropriately designed all-wheel drives it is also possible to achieve the described action with respect to the rear axle instead of the front axle by transferring braking power from the rear axle of the utility vehicle to the front axle so that the rear axle comes into an optimum traction range at the expense of the front axle and through this is decelerated with maximum braking power without becoming locked. In this case the decision as to whether the front axle or the rear axle should be optimized with regard to the braking operation is made dependent on whether the utility vehicle tends to have an oversteering or understeering behavior. Thus, for example, in the case of a utility vehicle designed to have an oversteering tendency, the aim is to be more likely to have a locking front axle and, in return, an optimally controlled rear axle, while in the case of a utility vehicle designed to have an oversteering tendency, a locking rear axle with optimally controlled front axle is advantageous.

The maximum braking torque is determined in a technically easy way while taking into account a maximum traction coefficient, where the maximum traction coefficient in turn can be determined dependent on a contact force measured on a wheel axle and possibly on the contact forces of the other wheel axles.

In another embodiment, the maximum traction coefficient is taken as a maximum value of a road surface-specific data set, which represents a specific road surface (for example, asphalt, loamy sand, mud) for the utility vehicle. Here the road-specific data set reflects a traction coefficient dependent on a drive slip, for example, as a characteristic curve. A maximum value of the traction coefficient can easily be determined in this way.

The road surface-specific data set in turn is determined by having available a plurality of different road surface-specific data sets (in particular a characteristic curve field with different characteristic curves) and the applicable road surface-specific data set is determined dependent on a vehicle traction value determined for the utility vehicle and a vehicle drive slip value determined for the utility vehicle. The combination of the two values enables an identification of the applicable or most likely applicable road surface-specific data set with low computation expense.

The vehicle traction value is determined dependent on the determined contact force. The vehicle traction value corresponds to the ratio of the total drive force transferred by the drive train of the utility vehicle and the sum of the contact forces present on the utility vehicle. A control of a braking device or an all-wheel clutch of the utility vehicle dependent on a determined contact force that can be realized with low technical cost arises in various embodiments via the mathematical/physical relationships.

The individual contact forces (for example, on a wheel axle or individual wheels) can be determined in various ways.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
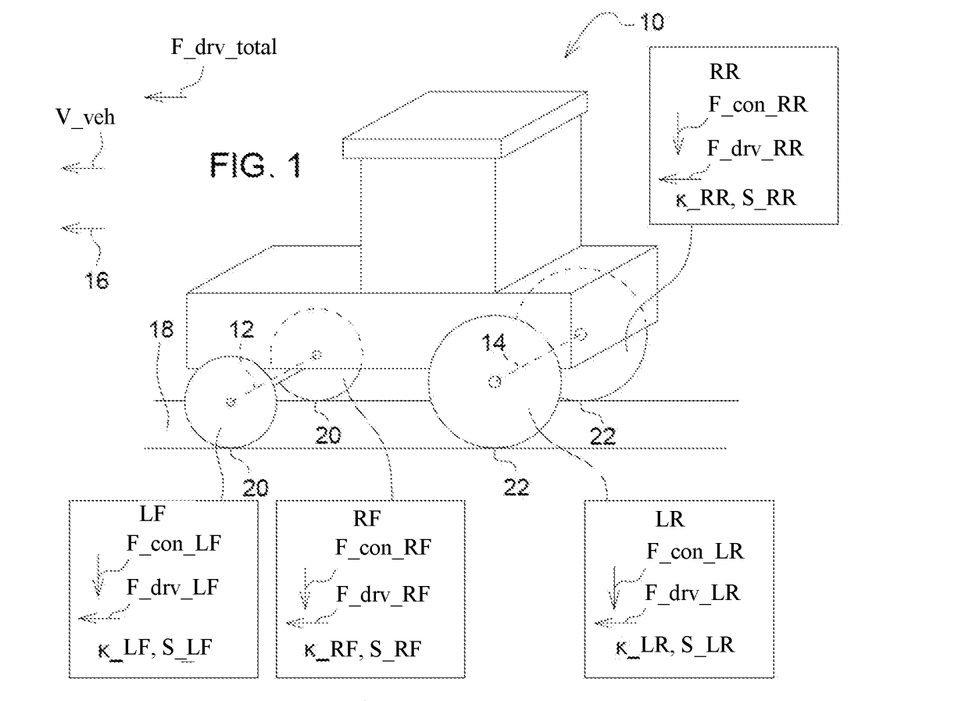
FIG. 1 shows a schematic perspective view of a utility vehicle.

FIG. 1 schematically shows a utility vehicle 10, which is designed in particular as a tractor or the like. The utility vehicle 10 has, as a first wheel axle, a front axle 12 and, as an additional wheel axle, a rear axle 14. A drive force F_drv_RF is associated with a right front wheel RF of the front axle 12 and a drive force F_drv_LF is associated with a left front wheel LF. A drive force F_drv_RR is associated with a right rear wheel RR of the rear axle 14 and a drive force F_drv_LR is associated with a left rear wheel LR. The contact forces F_con_RF and F_con_LF act on the front wheels, while the contact forces F_con_RR and F_con_LR act on the rear wheels. The utility vehicle 10 travels along a direction of travel 16 at a travel speed v_veh. Here a total drive force F_drv_total is transferred by the drive train of the utility vehicle and is divided into the already mentioned drive forces F_drv_RF, F_drv_LF, F_drv_RR, and F_drv_LR. A traction coefficient κ_RF and κ_LF and a drive slip s_RF and s_LF are associated with the two front wheels RF and LF, while a traction coefficient κ_RR and κ_LR and a drive slip s_RR and s_LR are associated with the two rear wheels.

The utility vehicle 10 travels on a road surface 18, which can have different surface properties (for example, asphalt, loamy sand, mud). The surface property of the driving track 20 of the front axle 12 on the one hand and the surface property of the driving track 22 of the rear axle 14 on the other hand can be the same (for example, in the case of a dry and solid road surface 18 or if the driving tracks 20, 22 are different) or can be different (for example, in the case of a wet road surface and identical driving tracks 20, 22).

In the embodiment of FIG. 1, the front axle 12 is connected to a support structure of the utility vehicle 10 via a suspension (for example, a hydraulic cylinder), while the rear axle 14 is connected unsuspended to the support structure. A contact force of the suspended front axle 12 can therefore be calculated, for example, as the sum of a spring force measured there by a sensor and the weight force of the unsuspended axle mass with respect to the front axle 12. For the unsuspended rear axle 14 such a determination of contact forces is not possible.

According to the method, a contact force on the rear axle 14, i.e., either for just one wheel RR or LR, or for both wheels, or for the entire wheel axle, is determined by first starting from the general physical equation:

$$\kappa = F\_drv / F\_con \quad (1),$$

where –κ is a traction coefficient (for example, of an individual wheel κ_RR or κ_LR on the rear axle 14), –F_drv is the drive force (for example, of an individual wheel F_drv_RR or F_drv_LR, or on the entire rear axle 14), which is usually directed in the direction of travel 16, and –F_con is the contact force (for example, of an individual wheel F_con_RR or F_con_LR, or on the entire rear axle 14).

The following mathematical/physical considerations are in part explained generally and can correspondingly be applied to each of the two rear wheels RR and LR of the rear axle 14, so that the contact force F_con_RR or F_con_LR can be determined for each rear wheel.

Generally, the contact force F_con is obtained according to equation (1) as $$F\_con = F\_drv / \kappa \quad (2).$$

The drive force F_drv of the rear axle 14 is known in that the drive forces F_drv_RF and F_drv_LF of the two front wheels RF and LF are derived from the total drive force F_drv_total in accordance with the drive train. The two drive forces F_drv_RF and F_drv_LF are assumed to be known, since they are estimated in the usual way, for example, on the basis of a torque measurement at the front axle or a measurement process, as is known, for example, from DE 10 2015 212 897 A1.

Thus, the two drive forces F_drv_RR and F_drv_LR can be estimated as each being half the drive force F_drv on the rear axle 14.

Therefore, only the traction coefficient κ according to equation (2) remains to be determined. This is done according to the present disclosure by employing the drive slip s_RR or s_LR associated with the rear axle 14 and a road surface-specific determination data set. Here the drive slip s_RR or s_LR is calculated for each rear wheel in the usual way, in particular via the speed of travel v_veh of the utility vehicle 10, the wheel rpms n_RR or n_LR, and the rolling radius of the tires r_RR or r_LR at the rear wheels RR and LR, s_RR/LR=(2π·r_RR/LR·n_RR/LR−v_veh)/(2πr_RR/LR·n_RR/LR).

The road surface-specific determination data set reflects a traction coefficient κ dependent on a drive slip s. Starting from the drive slip s_RR or s_LR on a rear wheel of the rear axle 14, which is known as described above, the unknown relevant traction coefficient κ_RR or κ_LR can thus be determined via the determination data set, which takes place by reading from a characteristic curve field, as explained below. Then, the relevant contact force F_con_RR or F_con_LR on the rear axle 14 can be determined from the determined traction coefficients κ_RR or κ_LR.

The road surface-specific determination data set itself is represented by a characteristic curve that is still to be described and is made available in that it is derived from a road surface-specific base data set. The base data set is likewise a characteristic curve that is still to be described, which reflects a traction coefficient κ dependent on a drive slip s. The base data set is associated with the front axle 12, i.e., the wheel axle or an individual wheel RF or LF. It is selected or determined from a plurality of provided different road surface-specific data sets.

Figure 2:
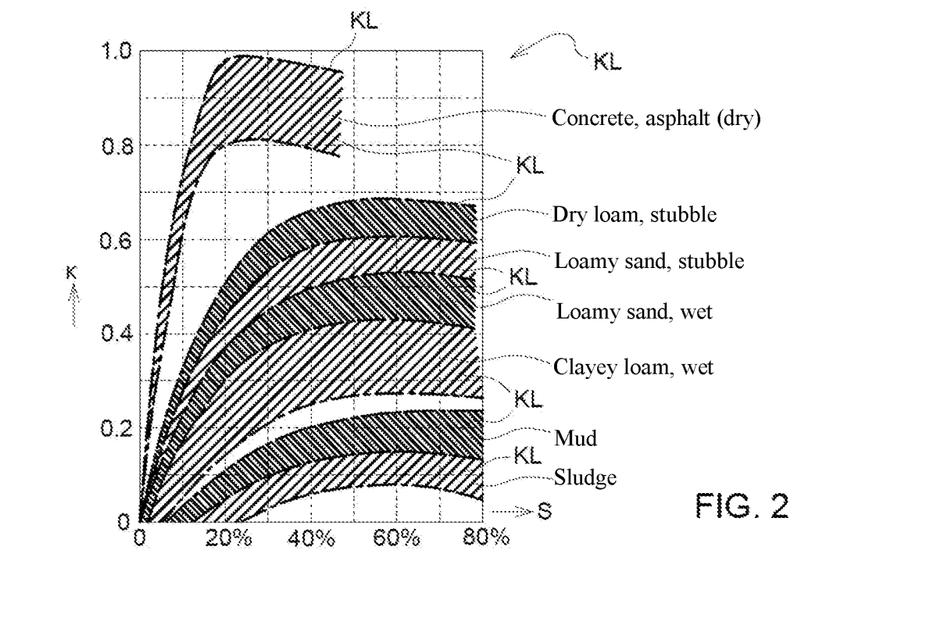
FIG. 2 shows a characteristic curve field with a representation of a traction coefficient dependent on a drive slip for different road surfaces.

According to FIG. 2, the different road surface-specific data sets are made available as a characteristic curve field. Different characteristic curves KL reflect a traction coefficient κ dependent on a drive slip s. One can learn from the diagram in FIG. 2 that individual characteristic curves KL or characteristic curve regions are dependent on road surface 18, thus are different in a road surface-specific way. For example, the characteristic curve regions "concrete, asphalt (dry)," "dry loam," and "mud" are shown. In turn, road surface specifically different characteristic curves KL can be found within each characteristic curve region.

Illustrative determinations of the road surface-specific base characteristic curve as base data set and the road surface-specific determination characteristic curve as determination data set are explained below by means of FIG. 3.

Figure 3:
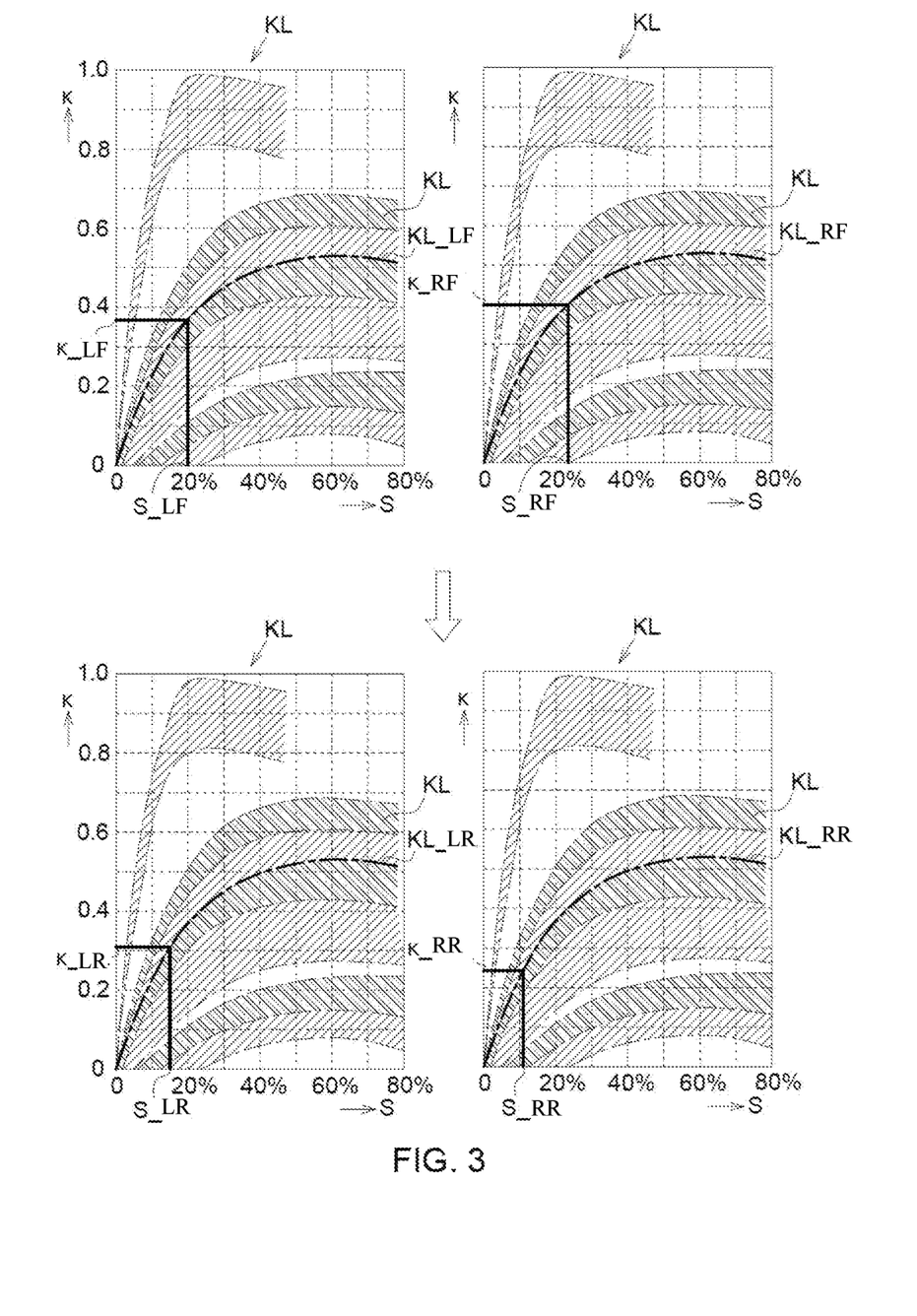
FIG. 3 shows characteristic curve fields for determination of the road surface on a wheel axle and estimation of the traction coefficient on a different wheel axle in a first embodiment.
Figure 4:
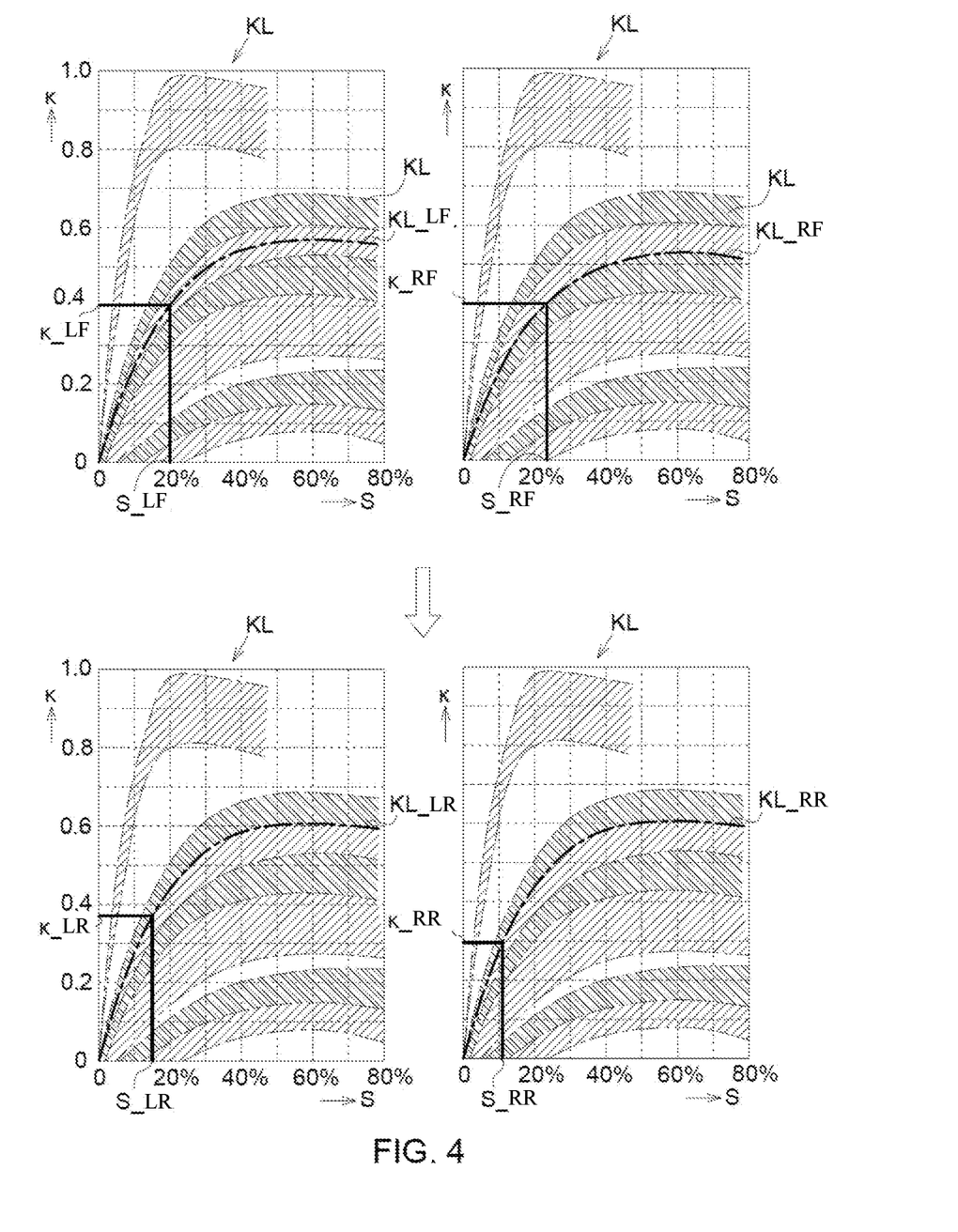
FIG. 4 shows characteristic curve fields for determination of the road surface on a wheel axle and estimation of the traction coefficient on a different wheel axle in another embodiment.

For the two front wheels RF and LF the values of the traction coefficients κ_RF and κ_LF are available via the known contact and drive forces on the front axle 12. Likewise, the values of the drive slip s_RF and s_LF are available for the two front wheels RF and LF by calculating them in the usual way, i.e., by analogy with the calculation of the already explained drive slip s_RR or s_LR on the rear axle 14.

dependent on these values the base characteristic curves KL_RF and KL_LF, which are indicated by a thick line in FIGS. 3 and 4, and which are associated with the front axle 12, are determined for the two front wheels RF and LF.

In the case according to FIG. 3, it is established by means of suitable physical parameters (for example, the vehicle speed v, steering status of the utility vehicle 10, driving track 20 of the front axle 12, driving track 22 of the rear axle 14, rolling radius of the wheels RF, LF of the front axle 12, rolling radius of the wheels RR, LR of the rear axle 14) that the rear wheels RR, LR use a different driving track than the front wheels RF, LF. In this case the determination characteristic curve associated with the rear axle 14 is identical to the base characteristic curve, i.e., the determination characteristic curve KL_RR, which is indicated with a heavy line and is associated with the right rear wheel RR, is identical to the base characteristic curve KL_RF and the determination characteristic curve KL_LR indicated with a heavy line and associated with the left rear wheel LR is identical to the base characteristic curve KL_LF.

In the case according to FIG. 4, it is established by means of suitable physical parameters (for example, the vehicle speed v, steering status of the utility vehicle 10, driving track 20 of the front axle 12, driving track 22 of the rear axle 14, rolling radius of the wheels RF, LF of the front axle 12, rolling radius of the wheels RR, LR of the rear axle 14) that the rear wheels RR, LR use the same driving track as the front wheels RF, LF. In this case, the determination characteristic curve KL_RR or KL_LR, which is indicated with a heavy line and is associated with the rear axle 14, is to be corrected on the basis of the base characteristic curve KL_RF or KL_LF in the direction of a more compact road surface 18.

In both of the cases according to FIG. 3 and FIG. 4, the drive slip s_RR and s_LR associated with the rear axle 14 is already known, as described above. Thus, the unknown value of the traction coefficient κ can be determined in each case by means of the determination characteristic curve KL_RR and KL_LR.

Figure 5:
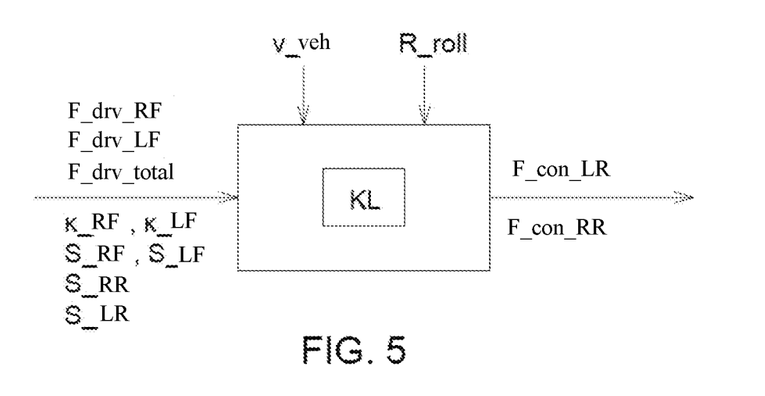
FIG. 5 shows a block diagram with a contact force determined according to the method of the present disclosure as a starting parameter.

Summarizing, one can, as represented by means of FIG. 5, and using the method with the knowledge of the total drive force F_drv_total, the drive forces F_drv_RF, F_drv_LF on a first wheel axle, the drive slip s_RF, s_LF on the first wheel axle, the drive slip s_RR, s_LR on an additional wheel axle, the traction coefficient κ_RF and κ_LF on the first wheel axle, optionally additional parameters such as speed of travel v_veh, rolling radius R_roll of the individual wheels RF, LF, RR, LR, provided characteristic curves KL, which each reflect a traction coefficient for different ground properties dependent on a drive slip, and a contact force, F_con_RR or F_con_LR on the additional wheel axle, in particular the rear wheel axle 14, can be determined, without a force sensor mechanism or the like on the additional wheel axle being necessary for this.

Figure 6:
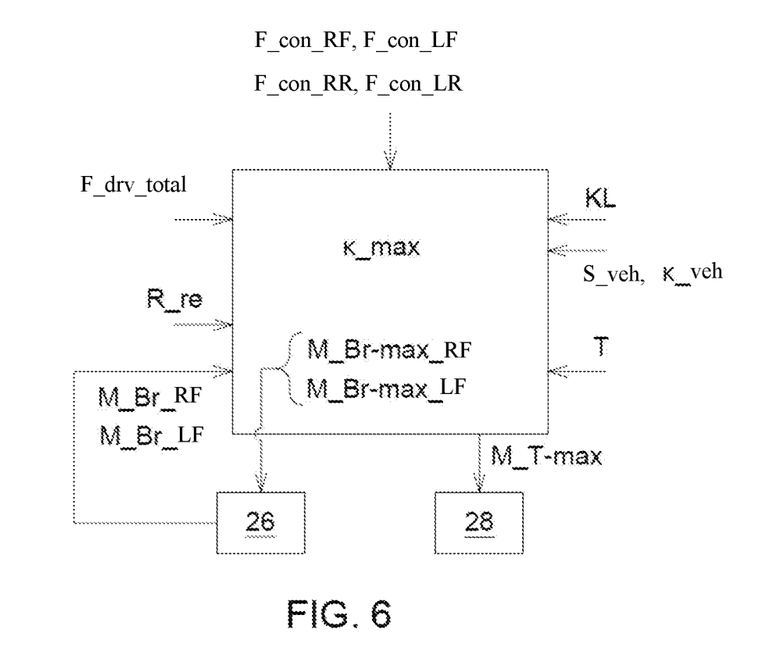
FIG. 6 shows a block diagram with a maximal transfer torque determined according to the method of the present disclosure as a starting parameter for control of an all-wheel clutch of a utility vehicle.

According to FIG. 6, contact forces F_con_RF, F_con_LF on the front axle 12 and F_con_RR, F_con_LR on the rear axle 14 of the utility vehicle 10 are determined in order to control a braking device 26 or an all-wheel clutch 28 of the utility vehicle 10 dependent on the determined contact forces F_con_RF, F_con_LF, F_con_RR, F_con_LR. Here it is not necessary to determine individual contact forces F_con_RF, F_con_LF, F_con_RR, F_con_LR by the method explained by means of FIG. 1 to FIG. 5. Rather, in another embodiment, individual contact forces F_con_RF, F_con_LF, F_con_RR, F_con_LR can be determined in any desired way so as to realize a control according to FIG. 6.

The control according to FIG. 6 is based on the consideration that in the case of the utility vehicle 10, in particular a tractor, the all-wheel drive is activated in a braking operation. Here the all-wheel drive is completely engaged via an all-wheel clutch. As a consequence of the activation of the all-wheel drive, the braking force on the rear wheels RR, LR also acts on the front wheels RF, LF via the drive train of the utility vehicle 10. This leads to an enhanced braking of the front wheels RF, LF. In order to avoid any locking of the front wheels, a maximum braking torque can be defined for each front wheel RF, LF:

$$M\_Br\text{-max}\_RF = \kappa\_max \cdot F\_con\_RF \cdot R\_tire \qquad (3)$$

for the right front wheel RF and $$M\_Br\text{-max}\_LF = \kappa\_max \cdot F\_con\_LF \cdot R\_tire \qquad (4)$$

for the left front wheel LF. The tire radii R_tire of the front wheels RF, LF are assumed to be known, likewise the contact forces F_con_RF, F_con_LF, as explained above. The maximum traction coefficient κ_max, as the maximum value of a characteristic curve KL that is to be determined, can be taken from the provided characteristic curve field according to FIG. 2. The applicable characteristic curve KL is determined by determining a traction coefficient κ_veh of the utility vehicle 10 and a drive slip s_veh of the utility vehicle 10.

The following is valid for the traction coefficient κ_veh:

$$\kappa\_veh = F\_drv\_total/(F\_con\_RF + F\_con\_LF + F\_con\_RR + F\_con\_LR) \quad (5)$$

The following is valid for the drive slip s_veh:

$$s\_veh = (v\_veh - v\_wheel)/v\_wheel \quad (6),$$

where in what follows v_wheel=v_RR and v_wheel=v_LR for the wheel speed.

A pertinent maximum drive slip that should be reached by an ABS (antilocking system) device on the front axle 12 in order to achieve a maximum braking in accordance with the maximum braking torque M_Br-max_RF, M_Br-max_LF can also be found from the maximum traction coefficient κ_max in the applicable characteristic curve KL, In this way, the front axle 12 of the utility vehicle 10, which is the main axle involved in the braking operation, can be operated in its optimum traction range, so that any locking of the front axle is avoided. Here a torque is set for the all-wheel clutch 28 such that its torque capacity does not exceed the maximum transfer torque. Since there should be no effect on the braking device 26, the braking torques M_Br_RF (on the front wheel RF) and M_Br_LF (on the front wheel LF) applied by the operating brake are dependent on the position of the brake pedal or the brake pressure and are assumed to be known. This results in a maximum permissible transfer torque M_T-max, which should be transferred from the brakes of the rear axle 14 to the front axle 12 via the all-wheel clutch 28 as:

$$M\_T\text{-max} = (M\_Br\text{-max}\_V - M\_Br\_V)/T \quad (7),$$

where M_Br-max_V is the sum of the maximum braking torques M_Br-max_RF and M_Br-max_LF, M_Br_V is the sum of the braking torques M_Br_RF and M_Br_LF, and T is the transfer of the all-wheel clutch 28 with respect to the end drive with respect to the front axle 12.

If there is an active differential in the front axle 12, equation (7) should be modified as follows:

$$M\_T\text{-max} = 2 \cdot M\_Br\_\text{min}/T \quad (8),$$

where M_Br_min is the smaller of the two values (M_Br-max_RF−M_Br_RF) and (M_Br-max_LF−M_Br_LF).

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for determining a contact force on a utility vehicle having a suspended front wheel axle with a left front wheel and a right front wheel and an unsuspended rear wheel axle with a left rear wheel and a right rear wheel, comprising:

determining a total drive force of a drive train of the utility vehicle;
determining a left front drive force of the left front wheel and a right front drive force of the right front wheel based on a torque measurement at the front wheel axle;
determining a rear drive force of the rear wheel axle based on the total drive force and the front drive force;
determining a left front contact force of the left front wheel and a right front contact force of the right front wheel based on a sum of a spring force at the front wheel axle measured by a sensor and the weight force of the unsuspended axle mass with respect to the front axle;
determining a left front traction coefficient for the left front wheel based upon the left front drive force and the left front contact force;
determining a right front traction coefficient for the right front wheel based upon the right front drive force and the right front contact force;
determining a left front drive slip of the left front wheel based on a speed of the utility vehicle, an rpm of the left front wheel, and a rolling radius of the left front wheel;
determining a right front drive slip of the right front wheel based on the speed of the utility vehicle, an rpm of the right front wheel, and a rolling radius of the right front wheel;
determining a left rear drive slip of the left rear wheel based on the speed of the utility vehicle, an rpm of the left rear wheel, and a rolling radius of the left rear wheel;
determining a right rear drive slip of the right rear wheel based on the speed of the utility vehicle, an rpm of the right rear wheel, and a rolling radius of the right rear wheel;
determining a left front base characteristic curve for the left front wheel, the left front base characteristic curve representing the left front traction coefficient as a function of the left front drive slip;
determining a right front base characteristic curve for the right front wheel, the right front base characteristic curve representing the right front traction coefficient as a function of the right front drive slip;
deriving a left rear determination characteristic curve for the left rear wheel from the left front base characteristic curve and a right rear determination characteristic curve for the right rear wheel from the right front base characteristic curve based on at least one of the speed of the utility vehicle, a steering status of the utility vehicle, a driving track of the front wheels, a driving track of the rear wheels, the rolling radius of the front wheels, and the rolling radius of the rear wheels;
determining a left rear contact force of the left rear wheel as a function of the left rear drive slip according to the left rear determination characteristic curve; and
determining a right rear contact force of the right rear wheel as a function of the right rear drive slip according to the right rear determination characteristic curve;
wherein an all-wheel clutch is actuated as a function of the determined front and rear contact forces.

2. The method of claim 1, wherein the rolling radius of the front wheels is different from the rolling radius of the rear wheels.

3. The method of claim 1, wherein the rolling radius of the front wheels is smaller than the rolling radius of the rear wheels.

4. The method of claim 1, wherein deriving the left rear determination characteristic curve and the right rear determination characteristic curve is based on the speed of the utility vehicle, the steering status of the utility vehicle, the driving track of the front wheels, the driving track of the rear wheels, the rolling radius of the front wheels, and the rolling radius of the rear wheels.

5. The method of claim 1, wherein the rear determination characteristic curves are the same as the respective front base characteristic curves when the rear wheels use a different driving track than the front wheels.

6. The method of claim 1, wherein the rear determination characteristic curves are adjusted from the front base characteristic curves when the rear wheels use the same driving track as the front wheels.

7. The method of claim 1, further comprising:
actuating the all-wheel clutch as a function of the determined front and rear contact forces;
transferring a torque from one of the wheel axles to another of the wheel axles via the all-wheel clutch;
controlling the all-wheel clutch so that the transferred torque does not exceed a predefined maximum torque; and
determining the maximum torque in dependence on a maximum braking torque.

8. The method of claim 7, further comprising:
determining the maximum braking torque dependent on a maximum traction coefficient.

9. The method of claim 8, further comprising:
determining the maximum traction coefficient from maximum values of the front base characteristic curves and the rear determination characteristic curves.

10. A method for determining a contact force on a utility vehicle having a suspended front wheel axle with a left front wheel and a right front wheel and an unsuspended rear wheel axle with a left rear wheel and a right rear wheel, comprising:
determining a total drive force of a drive train of the utility vehicle;
determining a left front drive force of the left front wheel and a right front drive force of the right front wheel based on a torque measurement at the front wheel axle;
determining a rear drive force of the rear wheel axle based on the total drive force and the front drive force;
determining a left front contact force of the left front wheel and a right front contact force of the right front wheel based on a sum of a spring force at the front wheel axle measured by a sensor and the weight force of the unsuspended axle mass with respect to the front axle;
determining a left front traction coefficient for the left front wheel based upon the left front drive force and the left front contact force;
determining a right front traction coefficient for the right front wheel based upon the right front drive force and the right front contact force;
determining a left front drive slip of the left front wheel based on a speed of the utility vehicle, an rpm of the left front wheel, and a rolling radius of the left front wheel;
determining a right front drive slip of the right front wheel based on the speed of the utility vehicle, an rpm of the right front wheel, and a rolling radius of the right front wheel;
determining a left rear drive slip of the left rear wheel based on the speed of the utility vehicle, an rpm of the left rear wheel, and a rolling radius of the left rear wheel;
determining a right rear drive slip of the right rear wheel based on the speed of the utility vehicle, an rpm of the right rear wheel, and a rolling radius of the right rear wheel;
determining a left front base characteristic curve for the left front wheel, the left front base characteristic curve representing the left front traction coefficient as a function of the left front drive slip;
determining a right front base characteristic curve for the right front wheel, the right front base characteristic curve representing the right front traction coefficient as a function of the right front drive slip;
deriving a left rear determination characteristic curve for the left rear wheel from the left front base characteristic curve and a right rear determination characteristic curve for the right rear wheel from the right front base characteristic curve based on at least one of the speed of the utility vehicle, a steering status of the utility vehicle, a driving track of the front wheels, a driving track of the rear wheels, the rolling radius of the front wheels, and the rolling radius of the rear wheels;
determining a left rear contact force of the left rear wheel as a function of the left rear drive slip according to the left rear determination characteristic curve; and
determining a right rear contact force of the right rear wheel as a function of the right rear drive slip according to the right rear determination characteristic curve;
wherein a brake device is actuated as a function of the determined front and rear contact forces.

11. The method of claim 10, wherein the rolling radius of the front wheels is different from the rolling radius of the rear wheels.

12. The method of claim 10, wherein the rolling radius of the front wheels is smaller than the rolling radius of the rear wheels.

13. The method of claim 10, wherein deriving the left rear determination characteristic curve and the right rear determination characteristic curve is based on the speed of the utility vehicle, the steering status of the utility vehicle, the driving track of the front wheels, the driving track of the rear wheels, the rolling radius of the front wheels, and the rolling radius of the rear wheels.

14. The method of claim 10, wherein the rear determination characteristic curves are the same as the respective front base characteristic curves when the rear wheels use a different driving track than the front wheels.

15. The method of claim 10, wherein the rear determination characteristic curves are adjusted from the front base characteristic curves when the rear wheels use the same driving track as the front wheels.

* * * * *